US011388339B2

(12) United States Patent
Chen et al.

(10) Patent No.: US 11,388,339 B2
(45) Date of Patent: Jul. 12, 2022

(54) ANTI-SHAKE METHOD FOR PANORAMIC VIDEO, AND PORTABLE TERMINAL

(71) Applicant: ARASHI VISION INC., Shenzhen (CN)

(72) Inventors: Cong Chen, Shenzhen (CN); Jingkang Liu, Shenzhen (CN); Wenjie Jiang, Shenzhen (CN); Yibin Guo, Shenzhen (CN)

(73) Assignee: ARASHI VISION INC., Shenzhen (CN)

(*) Notice: Subject to any disclaimer, the term of this patent is extended or adjusted under 35 U.S.C. 154(b) by 24 days.

(21) Appl. No.: 16/981,688

(22) PCT Filed: Mar. 15, 2019

(86) PCT No.: PCT/CN2019/078329
§ 371 (c)(1),
(2) Date: Sep. 16, 2020

(87) PCT Pub. No.: WO2019/174640
PCT Pub. Date: Sep. 19, 2019

(65) Prior Publication Data
US 2021/0006718 A1    Jan. 7, 2021

(30) Foreign Application Priority Data
Mar. 16, 2018    (CN) .......................... 201810217087.6

(51) Int. Cl.
*H04N 5/225*    (2006.01)
*H04N 5/232*    (2006.01)
(Continued)

(52) U.S. Cl.
CPC ......... *H04N 5/23267* (2013.01); *G03B 37/00* (2013.01); *G06T 5/002* (2013.01);
(Continued)

(58) Field of Classification Search
None
See application file for complete search history.

(56) References Cited

U.S. PATENT DOCUMENTS

2006/0119710 A1* 6/2006 Ben-Ezra .................. G06T 5/50
348/208.99
2008/0100716 A1* 5/2008 Fu ....................... H04N 5/23248
348/208.8
(Continued)

FOREIGN PATENT DOCUMENTS

CN    105376471 A    3/2016
CN    107040694 A    8/2017
(Continued)

*Primary Examiner* — Timothy J Henn
*Assistant Examiner* — Dwight Alex C Tejano
(74) *Attorney, Agent, or Firm* — Cheng-Ju Chiang

(57) ABSTRACT

The present invention provides an anti-shake method for a panoramic video, which comprises: obtaining, in real time, an output video frame, a fisheye image corresponding thereto, a pixel timestamp in the video frame, and a corresponding camera gyroscope timestamp; synchronizing the pixel timestamp in the video frame with the corresponding camera gyroscope timestamp, and calculating a rotation matrix of the camera movement in the camera gyroscope timestamp; smoothing the camera movement and establishing a coordinate system of a smooth trajectory; correcting the fisheye image distortion; and rendering the fisheye image by means of forward rendering to generate a stable video. According to the present invention, the rolling shutter distortion of a panoramic video sequence can be corrected, the image distortion caused by the rolling shutter of a CMOS can be corrected, and the rolling shutter is eliminated, thereby achieving a better anti-shake effect of a video image.

19 Claims, 3 Drawing Sheets

(51) Int. Cl.
*G03B 37/00* (2021.01)
*G06T 5/00* (2006.01)
(52) U.S. Cl.
CPC ......... *G06T 5/006* (2013.01); *H04N 5/23227* (2018.08); *H04N 5/23238* (2013.01)

(56) References Cited

U.S. PATENT DOCUMENTS

| | | | |
|---|---|---|---|
| 2009/0040291 A1* | 2/2009 | McCall | H04N 5/2259 348/36 |
| 2012/0105578 A1* | 5/2012 | Ohmiya | G06T 7/73 348/36 |
| 2014/0071227 A1* | 3/2014 | Takenaka | H04N 5/23238 348/36 |
| 2015/0062363 A1* | 3/2015 | Takenaka | H04N 5/23238 348/218.1 |
| 2017/0230631 A1 | 8/2017 | Chang et al. | |

FOREIGN PATENT DOCUMENTS

| | | |
|---|---|---|
| CN | 107801014 A | 3/2018 |
| CN | 108462838 A | 8/2018 |

* cited by examiner

ANTI-SHAKE METHOD FOR PANORAMIC VIDEO, AND PORTABLE TERMINAL

CROSS REFERENCE TO RELATED APPLICATIONS

The present application is a 35 U.S.C. § 371 National Phase conversion of International (PCT) Patent Application No. PCT/CN2019/078329, filed on Mar. 15, 2019, which claims priority of Chinese Patent Application No. 201810217087.6, filed on Mar. 16, 2018, the disclosure of which is incorporated by reference herein. The PCT International Patent Application was filed and published in Chinese.

FIELD OF THE INVENTION

The present invention relates generally to the field of video processing, and particularly relates to an anti-shake method for a panoramic video and a portable terminal.

BACKGROUND OF THE INVENTION

CMOS and CCD sensors are two types of image sensors that are currently commonly used. Both use photodiodes for photoelectric conversion to convert images into digital data. The main difference is the way in which digital data is transmitted.

The charge data of each pixel in each line of the CCD sensor will be transferred to the next pixel in turn, and be outputted from the bottom thereof, then be amplified and outputted by the amplifier at the edge of the sensor; while in the CMOS sensor, each pixel will be adjacent to one amplifier and an A/D conversion circuit, and data is outputted in a way similar to a memory circuit.

Generally, CMOS cameras use rolling shutter mode to obtain fisheye images through progressive exposure.

CMOS chips share the workload through many parallel A/Ds, but the entire array in the sensor must be converted one line at a time, which results in a small time delay between the readings of each line. Each individual line is usually able to start the exposure of the next frame when the readout of the previous frame is completed. Although the speed is very fast, the time delay between the readings of each line will be converted into the delay between the start of the exposure of each line, exposure of each line will not happen at the same time. The result is that each line in the frame will be exposed for the same time length, but the exposure will start at a different time point. Two frames are allowed to overlap exposure, and the final frame rate depends on the speed at which the scrolling readout process can be completed.

Such exposure mode causes a time difference between different lines of the same frame of image. If a handheld panoramic camera is used to shoot, when moving at high speeds, a jelly effect will occur due to the progressive exposure of the CMOS camera. The jelly effect is a problem that has not been well solved, especially for a VR panoramic video, and the anti-shake effect of video is poor.

SUMMARY OF THE INVENTION

The problem solved by the present invention is to provide an anti-shake method for a panoramic video, a computer-readable storage medium and a portable terminal, which aims to solve the jelly effect caused by the shaking of the picture due to the rolling shutter mode of the CMOS chip, and the poor anti-shake effect of the camera.

According to a first aspect, the present invention provides an anti-shake method for a panoramic video, comprises steps of:

obtaining, in real time, an output video frame, a fisheye image corresponding to the output video frame, a timestamp of the pixel in the video frame, and a corresponding camera gyroscope timestamp;

synchronizing the timestamp of the pixel in the video frame with the corresponding camera gyroscope timestamp, and calculating a rotation matrix of the camera movement in the camera gyroscope timestamp;

smoothing the camera movement and establishing a coordinate system of a smooth trajectory;

correcting the fisheye image distortion; and rendering the fisheye image by means of forward rendering to generate a stable video.

According to a second aspect, the present invention provides an anti-shake method for a panoramic video, comprises steps of:

S201, obtaining, in real time, an output video frame, a fisheye image corresponding to the output video frame, a timestamp of the pixel in the video frame, and a corresponding camera gyroscope timestamp;

S202, synchronizing the timestamp in the video frame to the camera gyroscope acquisition system, and calculating a rotation matrix of the camera movement in the timestamp of the pixel in the current video frame as the approximate rotation matrix of the camera when collecting the current pixel;

S203, projecting the output video frame pixels to the corresponding grid points of the spherical model, and using the approximate rotation matrix to rotate the corresponding grid points of the spherical model to the grid points in the sensor coordinate system; using the fisheye image distortion correction method to establish the relationship between the grid points in the sensor coordinate system and the pixels in the fisheye image to obtain approximate reverse-mapping pixels;

S204, calculating the camera gyroscope timestamp of the approximate reverse-mapping pixels in the fisheye image, obtaining the accurate rotation matrix of the camera when collecting the current pixel, and using the accurate rotation matrix to rotate the corresponding grid points of spherical model again to obtain the second grid points in the sensor coordinate system;

S205, using the fisheye image distortion correction method to establish the relationship between the second grid points in the sensor coordinate system and the pixels in the fisheye image to obtain accurate pixels in the fisheye image, and using the mapping relationship between the output video frame pixels and the accurate pixels in the fisheye image, rendering the fisheye image in reverse rendering to generate a stable video.

According to a third aspect, the present invention provides a computer-readable medium that stores a computer program or computer programs including set of computer-executable instructions, which when being executed by a processor or processors, cause the processor or processors to perform steps of the above-mentioned anti-shake method for a panoramic video.

According to a fourth aspect, the present invention provides a portable terminal, comprising:
one or more processors;
a memory; and
one or more computer programs where the one or more computer programs including set of computer-executable instructions are stored in the memory and are configured to be executed by the one or more processors, and when executed by the one or more processors, cause the one or more processors to perform the above-mentioned anti-shake method for a panoramic video.

In the present invention, based on the timestamp of the pixel in the video frame, the fisheye image is pixel by pixel converted into the coordinate system of the smooth trajectory using the rotation matrix of the camera motion under the timestamp of the current video frame pixel in real time, and then rendered and output; thereby the distortion of the rolling shutter of the panoramic video sequence can be corrected. The invention can correct the image distortion caused by the CMOS rolling shutter and eliminate the jelly effect, and achieve better video image anti-shake effect;

Further, in the present invention, according to the timestamp of the video frame pixel, calculating the rotation matrix of the camera movement under the timestamp of the current video frame pixel as the approximate rotation matrix of the camera when collecting the current pixel, projecting the output video frame pixels to the corresponding grid points of the spherical model, and using the approximate rotation matrix to rotate the corresponding grid points of the spherical model to the grid points in the sensor coordinate system; using the fisheye image distortion correction method to establish the relationship between the grid points in the sensor coordinate system and the pixels in the fisheye image to obtain approximate reverse mapping pixels, calculating the camera gyroscope timestamp of the approximate reverse-mapping pixels in the fisheye image, obtaining the accurate rotation matrix of the camera when collecting the current pixel, and using the accurate rotation matrix to rotate the corresponding grid points of spherical model again to obtain the second grid points in the sensor coordinate system; using the fisheye image distortion correction method to establish the relationship between the second grid points in the sensor coordinate system and the pixels in the fisheye image to obtain accurate pixels in the fisheye image, and using the mapping relationship between the output video frame pixels and the accurate pixels in the fisheye image, rendering the fisheye image in reverse rendering to generate a stable video. Thereby, the distortion of the rolling shutter of the panoramic video sequence can be corrected. The invention can correct the image distortion caused by the CMOS rolling shutter and eliminate the jelly effect, thereby achieve a better video image anti-shake effect.

DETAILED DESCRIPTION OF THE INVENTION

The foregoing objects, technical solutions and advantages of the invention will be much clearer from the following detail description taken with the accompanying drawings and embodiments. It should be understood that the specific embodiments described herein are only used to explain the present invention and are not intended to limit the present invention.

In order to explain the technical solutions of the present invention, the following will be described by specific embodiments.

First Embodiment

Figure 1:
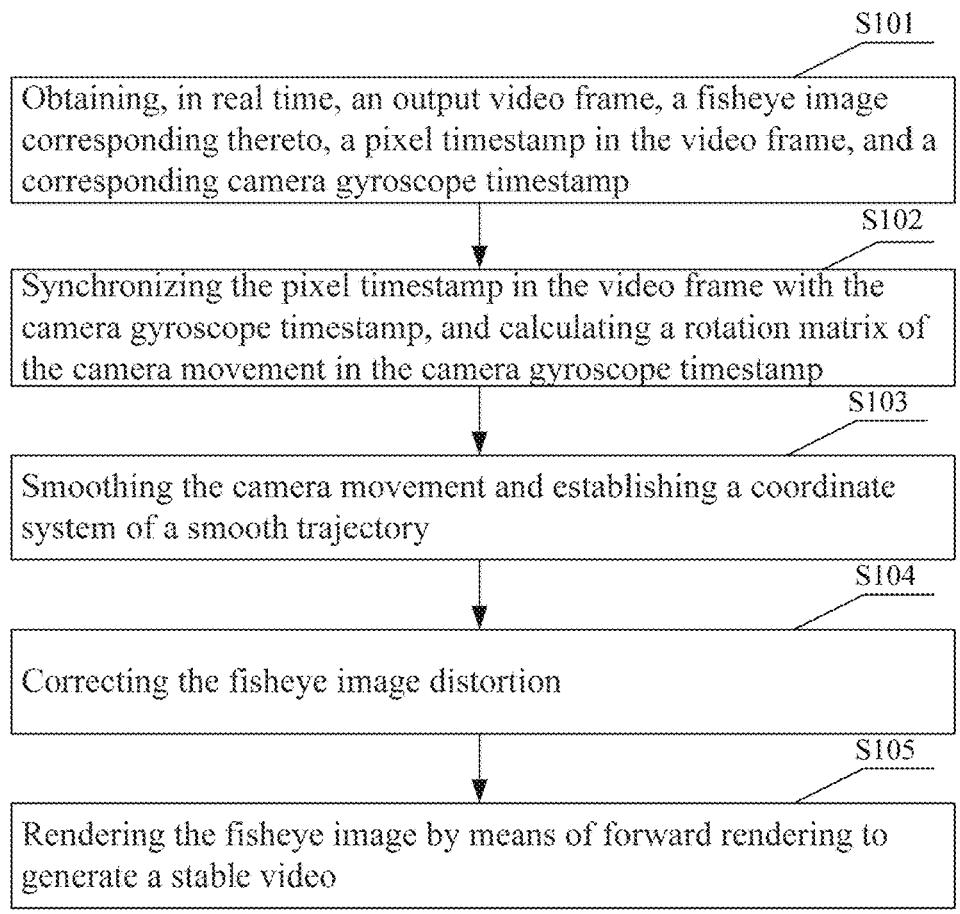
FIG. 1 is a flowchart of an anti-shake method for a panoramic video in accordance with a first embodiment of the present invention.

Referring to FIG. 1, an anti-shake method for a panoramic video provided in the first embodiment of the present invention comprising the following steps:

S101, obtaining, in real time, an output video frame, a fisheye image corresponding to the output video frame, a timestamp of the pixel in the video frame, and a corresponding camera gyroscope timestamp;

in the first embodiment of the present invention, S101 may specifically comprise the following steps:

S1011, obtaining the output video frame and the fisheye image corresponding to the output video frame;

S1012, obtaining the timestamp $t_{frame}^{k_{p(x,y)}}$ of the pixel p(x, y) in the k video frame in the time axis of a video frame acquisition system, where k is a natural number; and S1013, obtaining the gyroscope timestamp $t_{gyro}^{k_{p(x,y)}}$ in the time axis of the corresponding camera gyroscope acquisition system.

Figure 2:
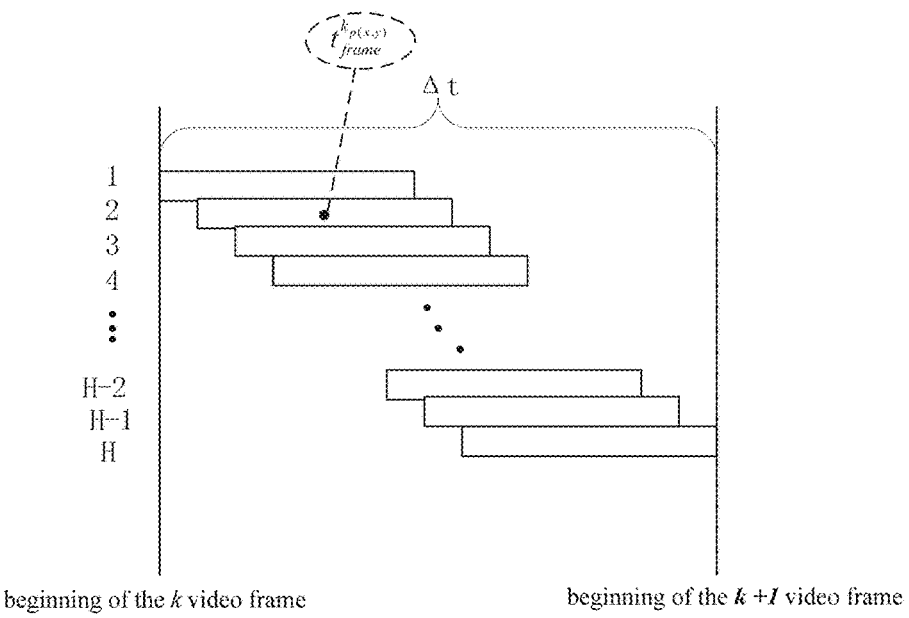
FIG. 2 is a schematic diagram of the timestamp of the scan line sequence of the CMOS camera in accordance with the first embodiment of the present invention.

S102, synchronizing the timestamp of the pixel in the video frame with the corresponding camera gyroscope timestamp, and calculating a rotation matrix of the camera movement in the camera gyroscope timestamp;

referring to FIG. 2, in the first embodiment of the present invention, S102 may specifically comprise the following steps:

S1021, calculating the timestamp $t_{frame}^{k_{p(x,y)}}$ of the pixel p(x, y) in the k video frame by formula (1):

$$t_{frame}^{k_{p(x,y)}} = t_{frame}^k + \frac{\Delta t}{H} y - \frac{1}{2}\Delta t; \quad (1)$$

in formula (1), $t_{frame}^{k_{p(x,y)}}$ is the timestamp of the pixel at the beginning of the k video frame, $\Delta t$ is a sampling time interval of the progressive scan of the video frame, and H is the number of lines of the image;

S1022, synchronizing the timestamp of the pixel in the k video frame with the camera gyroscope timestamp, a conversion relationship between the two as formula (2):

$$t_{gyro}^{k_{p(x,y)}} = \Delta T_0 + t_{frame}^{k_{p(x,y)}} \quad (2)$$

in formula (2), $\Delta T_0 = t_{gyro}^k - t_{frame}^k$, $t_{gyro}^k$ is the camera gyroscope timestamp at the beginning of the k video frame;

S1023, calculating a rotation matrix of the camera movement in the camera gyroscope timestamp at time $t_{gyro}^{kp(x,y)}$ by formula (3):

$$R_{w2s}(t_{gyro}^{kp(x,y)}) = R_{w2g}(t_{gyro}^{kp(x,y)}) \cdot R_{g2s}(t_{gyro}^{kp(x,y)}) \qquad (3)$$

in formula (3), $R_{w2g}(t_{gyro}^{kp(x,y)})$ is a rotation matrix measured by a gyroscope sensor at time $t_{gyro}^{kp(x,y)}$, $R_{g2s}(t_{gyro}^{kp(x,y)})$ is a rotation matrix from the calibrated gyroscope coordinate system to the camera, and $R_{w2s}(t_{gyro}^{kp(x,y)})$ is a 3*3 matrix.

S103, smoothing the camera movement and establishing a coordinate system of a smooth trajectory;

in the first embodiment of the present invention, S103 may specifically comprise the following steps:

S1031, where $P^s$ representing the 3D coordinates in the camera coordinate system, let $t = t_{gyro}^{kp(x,y)}$, converting the 3D coordinates $P_t^w$ in the world coordinate system to the 3D coordinates $P_t^s$ in the camera coordinate system at time t by a formula:

$$P_t^s = R_{w2s}(t) \cdot P_t^w + \vec{t_0} \qquad (4)$$

in the formula (4), $R_{w2s}(t)$ is a matrix of the camera coordinate system relative to the world coordinate system at time t, and $\vec{t_0}$ is a translation amount of the two frames before and after of the video frame of the camera;

S1032, smoothing the camera movement, where setting $\vec{t_0} = 0$ and then obtaining $$P_t^w = \frac{P_t^s}{R_{w2s}(t)};$$

S1033, establishing the coordinate system $P_t'$ of the smooth trajectory, performing a 3D grid rendering processing on the coordinate system $P_t'$ of the camera's smooth trajectory by OpenGl Rendering formula: $P_t^{g1} = K \cdot R_{mvp} \cdot P_t'$; where K is a perspective matrix, $R_{mvp}$ is a rotation matrix of the view direction manually controlled, and $P_t^{g1}$ is the 3D coordinates rendered by OpenGl in the coordinate system of the smooth trajectory; and S1034, in the coordinate system of the smooth trajectory, obtaining the minimum square difference of any pixel in $P_t'$ in the two frames before and after by a formula: $\min(P_{t+1}' - P_t')^2 + (P_t' - P_t^w)^2$, where $P_t'$ and $P_{t+1}'$ are the coordinate systems of the smooth trajectory of the two frames before and after, respectively; setting $P_t' = P_{t+1}' = P_t^w$, and obtaining the rendering formula as formula (5):

$$P_t^{g1} = K \cdot R_{mvp} \cdot R_{x2z(t)}^{-1} \cdot P_t^s \qquad (5)$$

calculating the 3D coordinates of the camera rendered to the coordinate system of the smooth trajectory by formula (5).

S104, correcting the fisheye image distortion.

In the first embodiment of the present invention, S104 may specifically comprise:

where let $$P^s = P_{\substack{k p(x,y) \\ t_{gyro}}}^s,$$

obtaining a panoramic expanded image of $P^s$ in the camera coordinate system:

$$P^s = \begin{cases} \cos(u)\cos(v) \\ \cos(u)\sin(v) \\ \sin(u) \end{cases} \qquad (6)$$

in formula (6), u and v are the abscissa and ordinate of the panoramic expanded image in the camera coordinate system, respectively;

a fisheye distortion model $\rho = f(\theta) = \theta(1 + k_0\theta^2 + k_1\theta^4 + k_2\theta^5 + k_3\theta^8)$, where $\theta$ is an incident angle of the light, $k_0$, $k_1$, $k_2$, and $k_3$ are the camera calibration coefficients, obtaining the corrected coordinates (x, y) of the fisheye image:

$$\begin{cases} x = f_x \cdot \rho \cdot \dfrac{P_x^s}{r} + x_c \\ y = f_y \cdot \rho \cdot \dfrac{P_y^s}{r} + y_c \end{cases} \qquad (7)$$

in formula (7), $r = \sqrt{P_x^{s2} + P_y^{s2}}$, and $\theta = \operatorname{atan}(r, P_z^s)$; the point $(x_c, y_c)$ is a projection center of the sensor, x and y are the 2D coordinates of the projection position of the camera sensor respectively.

S105, rendering the fisheye image by means of forward rendering to generate a stable video.

In the first embodiment of the present invention, S105 may specifically comprise the following steps of:

establishing a correspondence between the fisheye image and the grid points of the spherical model in the camera coordinate system by means of the fisheye image distortion correction method;

generating the grid points of the spherical model in the coordinate system of the smooth trajectory by rendering; and performing panoramic expansion of the grid points of the spherical model in the coordinate system of the smooth trajectory to generate a stable video. Where, specifically, color information can be input by interpolation, and projection can generate perspective images or asteroid images.

Figure 3:
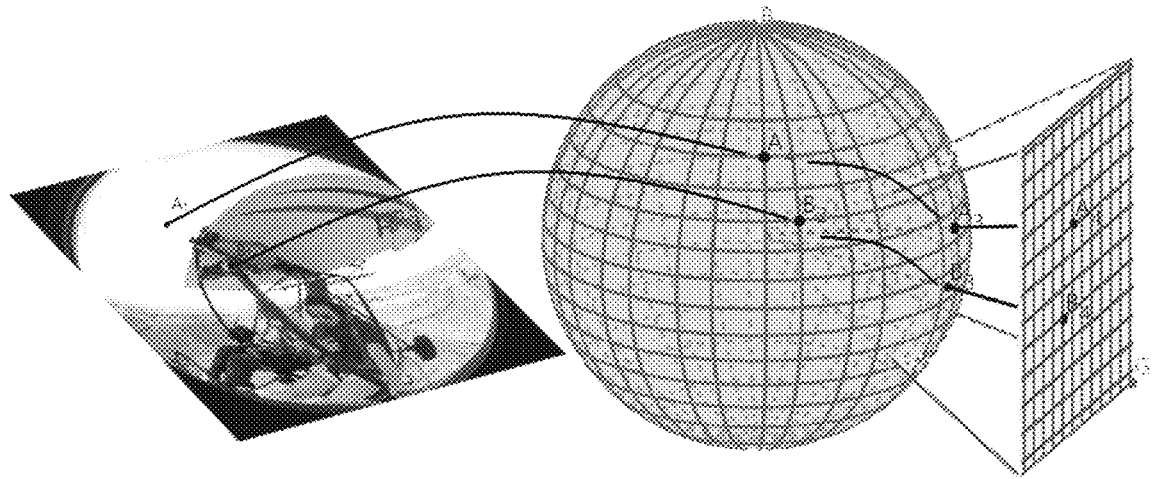
FIG. 3 is a mapping process diagram of a forward mapping rendering method in the anti-shake method for a panoramic video in accordance with the first embodiment of the present invention.

Referring to FIG. 3, in the first embodiment of the present invention:

$A_1$ corresponds to $A_2$, where $A_1$ is the coordinate in the fisheye image, $A_2$ corresponds to $A_1$, is the coordinate of the grid point of the spherical model in the camera coordinate system; $A_3$ corresponds to $A_2$, is the coordinate of the grid point of the spherical model in the coordinate system of the smooth trajectory generated by rendering; and $A_4$ is the coordinate point generated by the panoramic expansion projection of $A_3$;

Similarly, $B_1$ corresponds to $B_2$, where $B_1$ is the coordinate in the fisheye image, $B_2$ corresponds to $B_1$, is the coordinate of the grid point of the spherical model in the camera coordinate system; $B_3$ corresponds to $B_2$, is the coordinate of the grid point of the spherical model in the coordinate system of the smooth trajectory generated by rendering; and $B_4$ is the coordinate point generated by the panoramic expansion projection of $B_3$.

In the first embodiment of the present invention, based on the timestamp of the pixel in the video frame, the fisheye image is pixel by pixel converted into the coordinate system of the smooth trajectory using the rotation matrix of the camera motion under the timestamp of the current video frame pixel in real time, and then rendered and output; thereby the distortion of the rolling shutter of the panoramic video sequence can be corrected. The invention can correct the image distortion caused by the CMOS rolling shutter and eliminate the jelly effect, and achieve better video image anti-shake effect.

Second Embodiment

Figure 4:
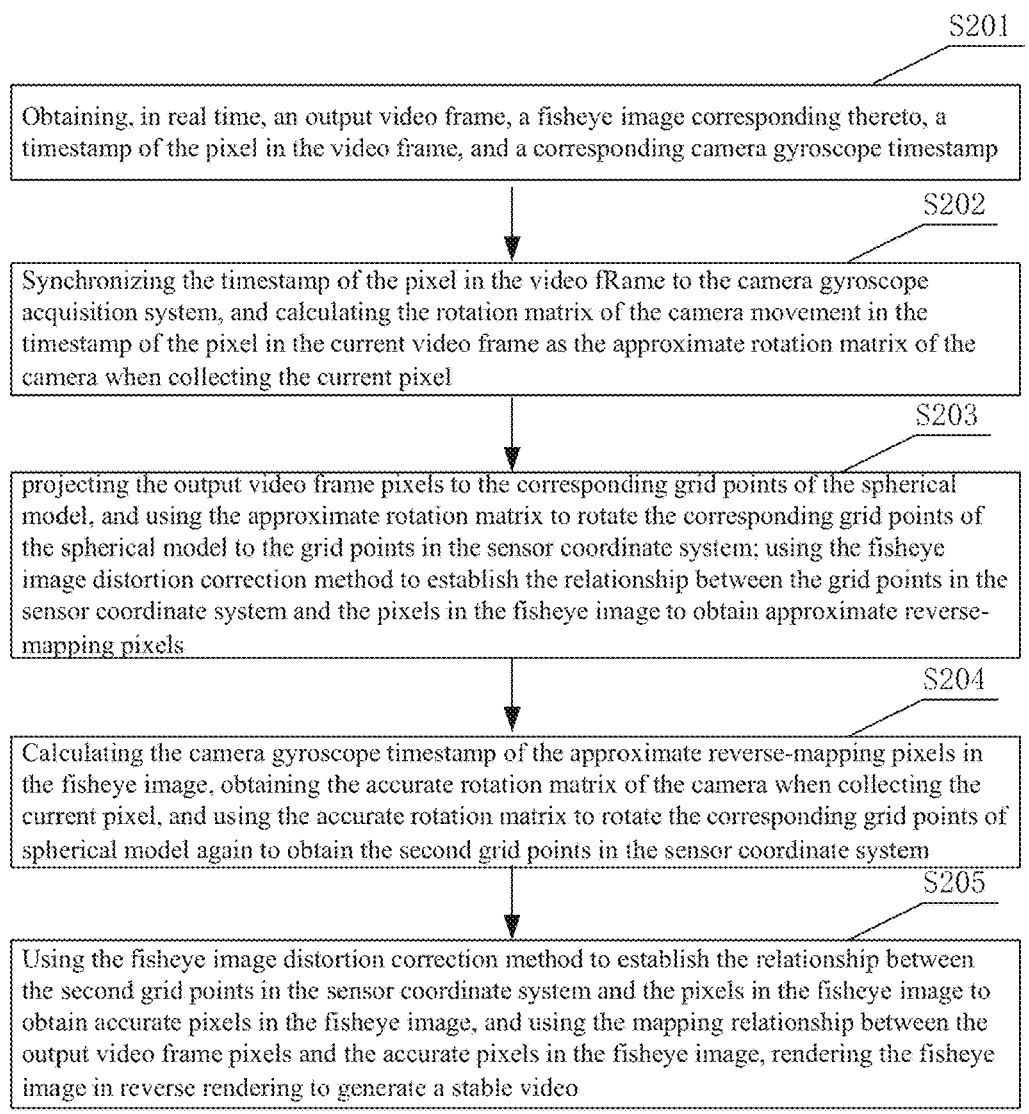
FIG. 4 is a flowchart of the anti-shake method for a panoramic video in accordance with a second embodiment of the present invention.

Referring to FIG. 4, an anti-shake method for a panoramic video provided in is the second embodiment of the present invention comprising the following steps:

S201, obtaining, in real time, an output video frame, a fisheye image corresponding to the output video frame, a timestamp of the pixel in the video frame, and a corresponding camera gyroscope timestamp;

in the second embodiment of the present invention, S201 may specifically comprise steps of:

S2011, obtaining the output video frame and the fisheye image corresponding to the output video frame;

S2012, obtaining the timestamp $t_{frame}^{k_{p(x,y)}}$ of the pixel p(x, y) in the k video frame in the time axis of a video frame acquisition system, where k is a natural number; and S2013, obtaining the gyroscope timestamp $t_{gyro}^{k_{p(x,y)}}$ in the time axis of the corresponding camera gyroscope acquisition system.

S202, synchronizing the timestamp of the pixel in the video frame to the camera gyroscope acquisition system, and calculating the rotation matrix of the camera movement in the timestamp of the pixel in the current video frame as the approximate rotation matrix of the camera when collecting the current pixel;

in the second embodiment of the present invention, S202 may specifically include the following steps:

S2021, synchronizing the timestamp of the pixel in the video frame to the camera gyroscope acquisition system, the conversion relationship between the two as shown in formula (8):

$$t_{gyro}^{k} = \Delta T_0 + t_{frame}^{k} \quad (8)$$

in formula (8), $\Delta T_0 = t_{gyro}^{k} - t_{frame}^{k}$, $t_{gyro}^{k}$ is the camera gyroscope timestamp at the beginning of the k video frame, and $t_{frame}^{k}$ is the timestamp of the pixel at the beginning of the k video frame;

S2022, calculating a rotation matrix of the camera movement under the timestamp of the pixel in the current video frame at time $t_{gyro}^{k}$ by formula (9):

$$R_{w2s}(t_{gyro}^{k}) = R_{w2g}(t_{gyro}^{k}) \cdot R_{g2s}(t_{gyro}^{k}) \quad (9)$$

in formula (9), $R_{w2g}(t_{gyro}^{k})$ is the rotation matrix measured by the gyroscope sensor at time $t_{gyro}^{k}$, $R_{w2g}(t_{gyro}^{k})$ is a 3*3 matrix; and $R_{g2s}(t_{gyro}^{k})$ is the rotation matrix from the calibrated gyroscope coordinate system to the camera.

S203, projecting the output video frame pixels to the corresponding grid points of the spherical model, and using the approximate rotation matrix to rotate the corresponding grid points of the spherical model to the grid points in the sensor coordinate system; using the fisheye image distortion correction method to establish the relationship between the grid points in the sensor coordinate system and the pixels in the fisheye image to obtain approximate reverse-mapping pixels;

in the second embodiment of the present invention, S203 may specifically be:

where let $$P^s = P^s_{\substack{k_{p(x,y)} \\ t_{gyro}}},$$

obtaining a panoramic expanded image of $P^s$ in the camera coordinate system:

$$P^s = \begin{cases} \cos(u)\cos(v) \\ \cos(u)\sin(v), \\ \sin(u) \end{cases}$$

where u and v are the abscissa and ordinate of the panoramic expanded image in the camera coordinate system, respectively;

a fisheye distortion model $92 = f(\theta) = \theta(1 + k_0\theta^2 + k_1\theta^4 + k_2\theta^B + k_3\theta^{\tilde{B}})$, where $\theta$ is an incident angle of the light, $k_0$, $k_1$, $k_2$, and $k_3$ are the camera calibration coefficients, obtaining the corrected coordinates (x, y) of the fisheye image:

$$\begin{cases} x = f_x \cdot \rho \cdot \dfrac{P^s_x}{r} + x_c \\ y = f_y \cdot \rho \cdot \dfrac{P^s_y}{r} + y_c \end{cases}$$

where $r = \sqrt{P_x^{s2} + P_y^{s2}}$ and $\theta = \text{atan}(r, P_z^s)$; the point $(x_c, y_c)$ is a projection center of the sensor, x and y are the 2D coordinates of the projection position of the camera sensor respectively.

S204, calculating the camera gyroscope timestamp of the approximate reverse-mapping pixels in the fisheye image, obtaining the accurate rotation matrix of the camera when collecting the current pixel, and using the accurate is rotation matrix to rotate the corresponding grid points of spherical model again to obtain the second grid points in the sensor coordinate system;

in the second embodiment of the present invention, the step of calculating the camera gyroscope timestamp of the approximate reverse-mapping pixels in the fisheye image, obtaining the accurate rotation matrix of the camera motion when collecting the current pixel, specifically is:

using the approximate reverse-mapping pixels in the fisheye image to calculate the camera gyroscope timestamp of the pixel by the formula:

$$t_{gyro}^{k_{p(x,y)}} = \Delta T_0 + t_{frame}^{k_{p(x,y)}} + \frac{\Delta t}{H} y - \frac{1}{2}\Delta t \quad (10)$$

in formula (10), $\Delta t$ is a sampling time interval of the progressive scan of the video frame, and H is the number of lines of the image;

further calculating the accurate rotation matrix $R_{w2s}(t_{gyro}^{k_{p(x,y)}})$ of the camera motion under the camera gyroscope timestamp, where the calculation formula is:

$$R_{w2s}(t_{gyro}^{k_{p(x,y)}}) = R_{w2g}(t_{gyro}^{k_{p(x,y)}}) \cdot R_{g2s}(t_{gyro}^{k_{p(x,y)}}).$$

S205, using the fisheye image distortion correction method to establish the relationship between the second grid points in the sensor coordinate system and the pixels in the fisheye image to obtain accurate pixels in the fisheye image, and using the mapping relationship between the output video frame pixels and the accurate pixels in the fisheye image, rendering the fisheye image in reverse rendering to generate a stable video.

Figure 5:
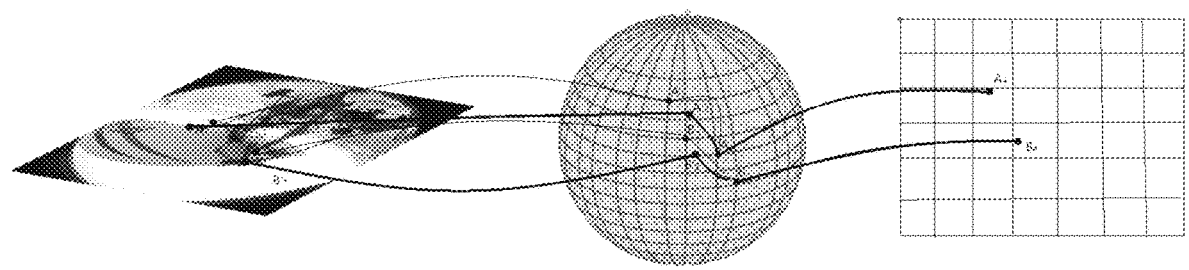
FIG. 5 is a mapping process diagram of a backward mapping rendering method in the anti-shake method for a panoramic video in accordance with the second embodiment of the present invention.

Referring to FIG. 5, in the second embodiment of the present invention:

projecting the output video frame pixel $A_4$ to the corresponding grid point $A_3$ of the spherical model, using the approximate rotation matrix to rotate $A_3$ to obtain $A_2$ in the sensor coordinate system, using the fisheye image distortion correction method to project $A_2$ onto the fisheye image to obtain the pixel $A_1$, using the accurate rotation matrix to rotate $A_1$ to obtain $A'_2$ in the sensor coordinate system, and then using the fisheye image distortion correction method to project $A'_2$ to the fisheye image to obtain the accurate pixel $A'_1$; using the mapping relationship between the output video frame pixel $A_4$ and the accurate pixel $A'_1$ in the fisheye image to render the fisheye image in reverse rendering to generate a stable video;

Similarly, projecting the output video frame pixel $B_4$ to the corresponding grid point $B_3$ of the spherical model, using the approximate rotation matrix to rotate $B_3$ to obtain $B_2$ in the sensor coordinate system, using the fisheye image distortion correction method to project $B_2$ onto the fisheye image to obtain pixel $B_1$, using the accurate rotation matrix to rotate $B_1$ to obtain $B'_2$ in the sensor coordinate system, and then using the fisheye image distortion correction method to project $B'_2$ to the fisheye image to obtain the accurate pixel $B'_1$; using the mapping between the output video frame pixel $B_4$ and the accurate pixel $B'_1$ in the fisheye image to render the fisheye image in reverse rendering to generate a stable video;

It should also be noted that the perspective view generated by the projection or the color information of the asteroid image is input by interpolation, and finally a stable video can be generated.

In the second embodiment of the present invention, according to the timestamp of the video frame pixel, calculating the rotation matrix of the camera movement under the timestamp of the current video frame pixel as the approximate rotation matrix of the camera when collecting the current pixel, projecting the output video frame pixels to the corresponding grid points of the spherical model, and using the approximate rotation matrix to rotate the corresponding grid points of the is spherical model to the grid points in the sensor coordinate system; using the fisheye image distortion correction method to establish the relationship between the grid points in the sensor coordinate system and the pixels in the fisheye image to obtain approximate reverse-mapping pixels, calculating the camera gyroscope timestamp of the approximate reverse-mapping pixels in the fisheye image, obtaining the accurate rotation matrix of the camera when collecting the current pixel, and using the accurate rotation matrix to rotate the corresponding grid points of spherical model again to obtain the second grid points in the sensor coordinate system; using the fisheye image distortion correction method to establish the relationship between the second grid points in the sensor coordinate system and the pixels in the fisheye image to obtain accurate pixels in the fisheye image, and using the mapping relationship between the output video frame pixels and the accurate pixels in the fisheye image, rendering the fisheye image in reverse rendering to generate a stable video. Thereby, the distortion of the rolling shutter of the panoramic video sequence can be corrected.

The invention can correct the image distortion caused by the CMOS rolling shutter and eliminate the jelly effect, thereby achieve a better video image anti-shake effect.

Third Embodiment

The third embodiment of the present invention provides a computer-readable storage medium that stores a computer program or computer programs including set of computer-executable instructions, which when being executed by a processor or processors, cause the processor or processors to perform steps of the anti-shake method for a panoramic video provided in the first or second embodiment of the present invention.

Fourth Embodiment

Figure 6:
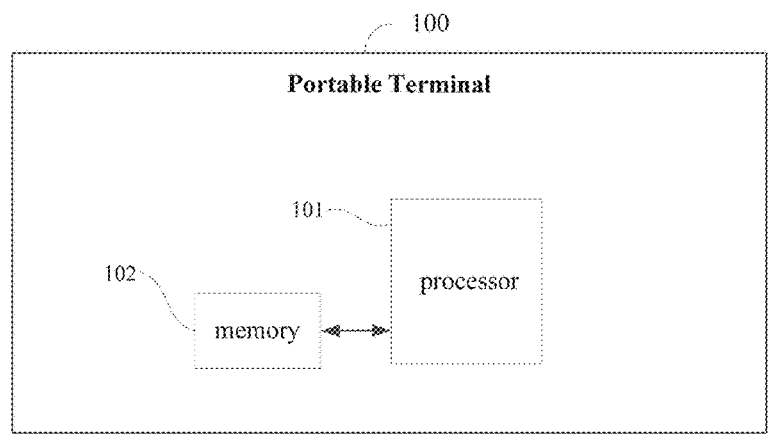
FIG. 6 is a schematic structural diagram of a portable terminal in accordance with a fourth embodiment of the present invention.

FIG. 6 shows a structural block diagram of a portable terminal provided in the fourth embodiment of the present invention. A portable terminal 100 comprises:

one or more processors 101, a memory 102, and one or more computer programs, where the one or more processors 101 and the memory 102 are connected by a bus, the one or more computer programs including set of computer-executable instructions are stored in the memory 102, and are configured to be executed by the one or more processors 101. The one or more processors 101 execute the one or more computer programs to perform steps of the anti-shake method for a panoramic video provided in the first or second embodiment of the present invention.

A person of ordinary skill in the art may understand that all or part of the steps in the method of the above-mentioned embodiments can be implemented by a program or programs instructing relevant hardware. The program or programs can be stored in a computer-readable storage medium, and the storage media can be, such as ROM/RAM, magnetic disk, optical disk, etc.

The above descriptions are only preferred embodiments of the present invention and are not intended to limit the present invention. Any modification, equivalent replacements and improvement made within the spirit and principle of the present invention shall be included in the protection of the present invention.

What is claimed is:

1. An anti-shake method for a panoramic video, comprising steps of:
    obtaining, in real time, an output video frame, a fisheye image corresponding to the output video frame, a timestamp of the pixel in the video frame, and a corresponding camera gyroscope timestamp;
    synchronizing the timestamp of the pixel in the video frame with the corresponding camera gyroscope timestamp, and calculating a rotation matrix of the camera movement in the camera gyroscope timestamp;
    smoothing the camera movement and establishing a coordinate system of a smooth trajectory;
    correcting the fisheye image distortion; and
    rendering the fisheye image by means of forward rendering to generate a stable video,
    wherein the step of obtaining, in real time, an output video frame, a fisheye image corresponding to the output video frame, a timestamp of the pixel in the video frame, and a corresponding camera gyroscope timestamp, specifically comprises:
    obtaining the output video frame and the fisheye image corresponding to the output video frame;
    obtaining the timestamp $t^k_{frame}{}^{p(x,y)}$ of the pixel p(x,y) in the k video frame in the time axis of a video frame acquisition system, where k is a natural number; and
    obtaining the gyroscope timestamp $t^k_{gyro}{}^{p(x,y)}$ in the time axis of the corresponding camera gyroscope acquisition system.

2. The method of claim 1, wherein the step of synchronizing the timestamp of the pixel in the video frame with the corresponding camera gyroscope timestamp, and calculating a rotation matrix of the camera movement in the camera gyroscope timestamp, specifically comprises:

calculating the timestamp $t^{k\,p(x,y)}_{frame}$ of the pixel P(x, Y) in the k video frame by formula (1):

$$t^{k\,p(x,y)}_{frame} = t^{k}_{frame} + \frac{\Delta t}{H} y - \frac{1}{2}\Delta t; \quad (1)$$

in formula (1), $t^{k}_{frame}$ is the timestamp of the pixel at the beginning of the k video frame, $\Delta t$ is a sampling time interval of the progressive scan of the video frame, and H is the number of lines of the image;

synchronizing the timestamp of the pixel in the k video frame with the camera gyroscope timestamp, a conversion relationship between the two as formula (2):

$$t^{k\,p(x,y)}_{gyro} = \Delta T_0 + t^{k\,p(x,y)}_{frame} \quad (2)$$

in formula (2), $\Delta T_0 = t^{k}_{gyro} - t^{k}_{frame}$, $t^{k}_{gyro}$ is the camera gyroscope timestamp at the beginning of the k video frame; and calculating a rotation matrix of the camera movement in the camera gyroscope timestamp at time $t^{k\,p(x,y)}_{gyro}$ by formula (3):

$$R_{w2s}(t^{k\,p(x,y)}_{gyro}) = R_{w2g}(t^{k\,p(x,y)}_{gyro}) \cdot R_{g2s}(t^{k\,p(x,y)}_{gyro}) \quad (3)$$

in formula (3), $R_{w2g}(t^{k\,p(x,y)}_{gyro})$ is a rotation matrix measured by a gyroscope sensor at time $t^{k\,p(x,y)}_{gyro}$, and $R_{g2s}(t^{k\,p(x,y)}_{gyro})$ is a rotation matrix from the calibrated gyroscope coordinate system to the camera.

3. The method of claim 2, wherein the step of smoothing the camera movement and establishing a coordinate system of a smooth trajectory, specifically comprises:

where $P^s$ representing the 3D coordinates in the camera coordinate system, let $t = t^{k\,p(x,y)}_{gyro}$, converting the 3D coordinates $P^w_t$ in the world coordinate system to the 3D coordinates $P^s_t$ in the camera coordinate system at time t by a formula:

$$P^s_t = R_{w2s}(t) \cdot P^w_t + \vec{t}_0 \quad (4)$$

in the formula (4), $R_{w2s}(t)$ is a matrix of the camera coordinate system relative to the world coordinate system at time t, and $\vec{t}_0$ is a translation amount of the two frames before and after of the video frame of the camera;

smoothing the camera movement, where setting $\vec{t}_0 = 0$ and then obtaining $$P^w_t = \frac{P^s_t}{R_{w2s}(t)};$$

establishing a coordinate system $P'_t$ of a smooth trajectory, performing a 3D grid rendering processing on the coordinate system $P'_t$ of the camera's smooth trajectory by a rendering formula: $P^{gl}_t = K \cdot R_{awp} \cdot P'_t$; where K is a perspective matrix, $R_{mvp}$ is a rotation matrix of the view direction manually controlled, and $P^{gl}_t$ is the 3D coordinates rendered in the coordinate system of the smooth trajectory; and in the coordinate system of the smooth trajectory, obtaining the minimum square difference of any pixel in $P'_t$ in the two frames before and after by a formula: min $(P'_{t+1} - P'_t)^2 + (P'_t - P^w_t)^2$, where $P'_t$ and $P'_{t+1}$ are the coordinate systems of the smooth trajectory of the two frames before and after, respectively; setting $P'_t = P'_{t+1} = P^w_t$, and obtaining the rendering formula as formula (5):

$$P^{gl}_t = K \cdot R_{mvp} \cdot R_{w2s(t)}^{-1} \cdot P^s_t \quad (5)$$

calculating the 3D coordinates of the camera rendered to the coordinate system of the smooth trajectory by the formula (5).

4. The method of claim 3, wherein the step of correcting the fisheye image distortion, specifically comprises:

where let $$P^s = P^s_{t^{k\,p(x,y)}_{gyro}},$$

obtaining a panoramic expanded image of $P^s$ in the camera coordinate system:

$$P^s = \begin{cases} \cos(u)\cos(v) \\ \cos(u)\sin(v) \\ \sin(u) \end{cases} \quad (6)$$

in formula (6), u and v are the abscissa and ordinate of the panoramic expanded image in the camera coordinate system, respectively;

a fisheye distortion model $\rho f(\theta) = \theta(1 + k_0\theta^2 + k_1\theta^4 + k_2\theta^6 + k_3\theta^8)$ where $\theta$ is an incident angle of the light, $k_0$, $k_1$, $k_2$, and $k_3$ are the camera calibration coefficients, obtaining the corrected coordinates (x, y) of the fisheye image:

$$\begin{cases} x = f_x \cdot \rho \cdot \frac{P^s_x}{r} + x_c \\ y = f_y \cdot \rho \cdot \frac{P^s_y}{r} + y_c \end{cases} \quad (7)$$

in formula (7), $r = \sqrt{P^{s2}_x + P^{s2}_y}$, and $\theta = \text{atan}(r, P^s_z)$; the point $(x_c, y_c)$ is a projection center of the sensor, x and y are the 2D coordinates of a projection position of the camera sensor respectively.

5. The method of claim 4, wherein the step of rendering the fisheye image by means of forward rendering to generate a stable video, specifically comprises:

establishing a correspondence between the fisheye image and grid points of the spherical model in the camera coordinate system by means of a fisheye image distortion correction method;

generating grid points of the spherical model in the coordinate system of the smooth trajectory by rendering; and performing panoramic expansion for the grid points of the spherical model in the coordinate system of the smooth trajectory to generate a stable video.

6. A non-transitory computer-readable medium that stores one or more computer programs including a set of computer-executable instructions, wherein when being executed by one or more processors, cause the one or more processors to perform steps of the anti-shake method for a panoramic video of claim 1.

7. A portable terminal, comprising:
one or more processors;
a memory; and
one or more computer programs including a set of computer-executable instructions, where the set of computer-executable instructions are stored in the memory and are configured to be executed by the one or more processors, wherein when being executed by the one or more processors, cause the one or more processors to perform steps of an anti-shake method for a panoramic video:
obtaining, in real time, an output video frame, a fisheye image corresponding to the output video frame, a timestamp of the pixel in the video frame, and a corresponding camera gyroscope timestamp;
synchronizing the timestamp of the pixel in the video frame with the corresponding camera gyroscope timestamp, and calculating a rotation matrix of the camera movement in the camera gyroscope timestamp;
smoothing the camera movement and establishing a coordinate system of a smooth trajectory;
correcting the fisheye image distortion; and
rendering the fisheye image by means of forward rendering to generate a stable video;
wherein the step of obtaining, in real time, an output video frame, a fisheye image corresponding to the output video frame, a timestamp of the pixel in the video frame, and a corresponding camera gyroscope timestamp, specifically comprises:
obtaining the output video frame and the fisheye image corresponding to the output video frame:
obtaining the timestamp $t_{frame}^{k\,p(x,y)}$ of the pixel p(x,y) in the k video frame in the time axis of a video frame acquisition system, where k is a natural number; and
obtaining the gyroscope timestamp $t_{gyro}^{k\,p(x,y)}$ in the time axis of the corresponding camera gyroscope acquisition system.

8. The portable terminal of claim 7, wherein the step of synchronizing the timestamp of the pixel in the video frame with the corresponding camera gyroscope timestamp, and calculating a rotation matrix of the camera movement in the camera gyroscope timestamp, specifically comprises:
calculating the timestamp $t_{frame}^{k\,p(x,y)}$ of the pixel P(x,y) in the k video frame by formula (1):

$$t_{frame}^{k\,p(x,y)} = t_{frame}^{k} + \frac{\Delta t}{H} y - \frac{1}{2}\Delta t; \quad (1)$$

in formula (1), $t_{frame}^{k}$ is the timestamp of the pixel at the beginning of the k video frame, $\Delta t$ is a sampling time interval of the progressive scan of the video frame, and H is the number of lines of the image;
synchronizing the timestamp of the pixel in the k video frame with the camera gyroscope timestamp, a conversion relationship between the two as formula (2):

$$t_{gyro}^{k\,p(x,y)} = \Delta T_0 + t_{frame}^{k\,p(x,y)} \quad (2)$$

in formula (2), $\Delta T = t_{gyro}^{k} - t_{frame}^{k}$, $t_{gyro}^{k}$ is the camera gyroscope timestamp at the beginning of the k video frame; and
calculating a rotation matrix of the camera movement in the camera gyroscope timestamp at time $t_{gyro}^{k\,p(x,y)}$ by formula (3):

$$R_{w2s}(t_{gyro}^{k\,p(x,y)}) = R_{w2g}(t_{gyro}^{k\,p(x,y)}) \cdot R_{g2s}(t_{gyro}^{k\,p(x,y)}) \quad (3)$$

in formula (3), $R_{w2g}(t_{gyro}^{k\,p(x,y)})$ is a rotation matrix measured by a gyroscope sensor at time $t_{gyro}^{k\,p(x,y)}$, and $R_{g2s}(t_{gyro}^{k\,p(x,y)})$ is a rotation matrix from the calibrated gyroscope coordinate system to the camera.

9. The portable terminal of claim 8, wherein the step of smoothing the camera movement and establishing a coordinate system of a smooth trajectory, specifically comprises:
where $P^s$ representing the 3D coordinates in the camera coordinate system, let $t=t_{gyro}^{k\,p(x,y)}$, converting the 3D coordinates $P_t^w$ in the world coordinate system to the 3D coordinates $P_t^s$ in the camera coordinate system at time t by a formula:

$$P_t^s = R_{w2s}(t) \cdot P_t^w + \vec{t_0} \quad (4)$$

in the formula (4), $R_{w2s}(t)$ is a matrix of the camera coordinate system relative to the world coordinate system at time t, and $\vec{t_0}$ a translation amount of the two frames before and after of the video frame of the camera;
smoothing the camera movement, where setting $\vec{t_0}=0$ and then obtaining $$P_t^w = \frac{P_t^s}{R_{w2s}(t)};$$

establishing a coordinate system $P'_t$ of a smooth trajectory, performing a 3D grid rendering processing on the coordinate system $P'_t$ of the camera's smooth trajectory by a rendering formula: $P_t^{gl} = K \cdot R_{mvp} \cdot P'_t$; where K is a perspective matrix $R_{mvp}$ is a rotation matrix of the view direction manually controlled, and $P_t^{gl}$ is the 3D coordinates rendered in the coordinate system of the smooth trajectory; and
in the coordinate system of the smooth trajectory, obtaining the minimum square difference of any pixel in $P_t'$ in the two frames before and after by a formula: min $(P_{t+1}'-P'_t)^2+(P_t'-P_t^w)^2$, where $P_t'$ and $P_{t+1}'$ are the coordinate systems of the smooth trajectory of the two frames before and after, respectively; setting $P'_t = P_{t+1}' = P_t^w$, and obtaining the rendering formula as formula (5):

$$P_t^{gl} = K \cdot R_{mvp} \cdot R_{w2s(t)}^{-1} \cdot P_t^s \quad (5)$$

calculating the 3D coordinates of the camera rendered to the coordinate system of the smooth trajectory by the formula (5).

10. The portable terminal of claim 9, wherein the step of correcting the fisheye image distortion, specifically comprises:
where let $$P^s = P^s_{k\,p(x,y)\atop t_{gyro}},$$

obtaining a panoramic expanded image of $P^s$ in the camera coordinate system:

$$P^s = \begin{cases} \cos(u)\cos(v) \\ \cos(u)\sin(v) \\ \sin(u) \end{cases} \quad (6)$$

in formula (6), u and v are the abscissa and ordinate of the panoramic expanded image in the camera coordinate system, respectively;

a fisheye distortion model $\rho=f(\theta)=\theta(1+k_0\theta^2+k_1\theta^4+k_2\theta^6+k_3\theta^8)$ where $\theta$ is an incident angle of the light, $k_0$, $k_1$, $k_2$, and $k_3$ are the camera calibration coefficients, obtaining the corrected coordinates (x, y) of the fisheye image:

$$\begin{cases} x = f_x \cdot \rho \cdot \dfrac{P_x^s}{r} + x_c \\ y = f_y \cdot \rho \cdot \dfrac{P_y^s}{r} + y_c \end{cases} \quad (7)$$

in formula (7), $\sqrt{r=P_x^{s2}+P_y^{s2}}$, and $\theta=\operatorname{atan}(r,P_z^s)$; the point $(x_c,y_c)$ is a projection center of the sensor, x and y are the 2D coordinates of a projection position of the camera sensor respectively.

11. The portable terminal of claim 10, wherein the step of rendering the fisheye image by means of forward rendering to generate a stable video, specifically comprises:
   establishing a correspondence between the fisheye image and grid points of the spherical model in the camera coordinate system by means of a fisheye image distortion correction method;
   generating grid points of the spherical model in the coordinate system of the smooth trajectory by rendering; and
   performing panoramic expansion for the grid points of the spherical model in the coordinate system of the smooth trajectory to generate a stable video.

12. An anti-shake method for a panoramic video, comprising steps of:
   S201, obtaining, in real time, an output video frame, a fisheye image corresponding to the output video frame, a timestamp of the pixel in the video frame, and a corresponding camera gyroscope timestamp;
   S202, synchronizing the timestamp of the pixel in the video frame to the corresponding camera gyroscope acquisition system, and calculating a rotation matrix of the camera movement in the timestamp of the pixel in the current video frame, as an approximate rotation matrix of the camera when collecting the current pixel;
   S203, projecting the output video frame pixels to the corresponding grid points of the spherical model, and using the approximate rotation matrix to rotate the corresponding grid points of the spherical model to the grid points in the sensor coordinate system; using a fisheye image distortion correction method to establish a relationship between the grid points in the sensor coordinate system and the pixels in the fisheye image to obtain approximate reverse-mapping pixels;
   S204, calculating the camera gyroscope timestamp of the approximate reverse-mapping pixels in the fisheye image, obtaining the accurate rotation matrix of the camera when collecting the current pixel, and using the accurate rotation matrix to rotate the corresponding grid points of spherical model again to obtain the second grid points in the sensor coordinate system; and
   S205, using the fisheye image distortion correction method to establish the relationship between the second grid points in the sensor coordinate system and the pixels in the fisheye image to obtain accurate pixels in the fisheye image, and using a mapping relationship between the output video frame pixels and the accurate pixels in the fisheye image, rendering the fisheye image in reverse rendering to generate a stable video.

13. The method of claim 12, wherein S201 specifically comprises:
   obtaining the output video frame and the fisheye image corresponding to the output video frame;
   obtaining the timestamp $t^k_{frame}{}^{p(x,y)}$ of the pixel p(x,y) in the k video frame in the time axis of a video frame acquisition system, where k is a natural number; and
   obtaining the gyroscope timestamp $t^k_{gyro}{}^{p(x,y)}$ in the time axis of the corresponding camera gyro gyroscope acquisition system.

14. The method of claim 13, wherein S202 specifically comprises steps:
   synchronizing the timestamp of the pixel in the video frame to the corresponding camera gyroscope acquisition system, a conversion relationship between the two as shown in formula (8):

$$t_{gyro}{}^k = \Delta T_0 + t_{frame}{}^k \quad (8)$$

where in formula (8), $\Delta T_0 = t_{gyro}{}^k - t_{frame}{}^k$; $t_{gyro}{}^k$ is the camera gyroscope timestamp at the beginning of the k video frame, and $t_{frame}{}^k$ is the timestamp at the beginning of the k video frame; and
   calculating a rotation matrix of the camera movement under the timestamp of the pixel in the current video frame at time $t_{gyro}{}^k$ by formula (9):

$$R_{w2s}(t_{gyro}{}^k) = R_{w2g}(t_{gyro}{}^k) \cdot R_{g2s}(t_{gyro}{}^k) \quad (9)$$

where in formula (9), $R_{w2g}(t_{gyro}{}^k)$ is s rotation matrix measured by the gyroscope sensor at time $t_{gyro}{}^k$, and $R_{g2s}(t_{gyro}{}^k)$ is a rotation matrix from the calibrated gyroscope coordinate system to the camera.

15. The method of claim 14, wherein S203 is that:
   where let $$P^s = P^s_{k_{p(x,y)}}_{t_{gyro}^s},$$

obtaining a panoramic expanded image of $P^s$ in the camera coordinate system:

$$P^s = \begin{cases} \cos(u)\cos(v) \\ \cos(u)\sin(v), \\ \sin(u) \end{cases}$$

where u and v are the abscissa and ordinate of the panoramic expanded image in the camera coordinate system, respectively;
   a fisheye distortion model $\rho=f(\theta)=\theta(1+k_0\theta^2+k_1\theta^4+k_2\theta^6+k_3\theta^8)$, where $\theta$ is an incident angle of the light, $k_0$, $k_1$, $k_2$, and $k_3$ are the camera calibration coefficients, obtaining the corrected coordinates (x, y) of the fisheye image:

$$\begin{cases} x = f_x \cdot \rho \cdot \dfrac{P_x^s}{r} + x_c \\ y = f_y \cdot \rho \cdot \dfrac{P_y^s}{r} + y_c \end{cases},$$

where $r=\sqrt{P_x^{s2}+P_y^{s2}}$ and $\theta=\operatorname{atan}(r, P_z^s)$; the point $(x_c,y_c)$ is a projection center of the sensor, x and y are the 2D coordinates of a projection position of the camera sensor respectively.

16. The method of claim 15, wherein the step of calculating the camera gyroscope timestamp of the approximate reverse-mapping pixels in the fisheye image, obtaining the accurate rotation matrix of the camera motion when collecting the current pixel, specifically is:

using the approximate reverse-mapping pixels in the fisheye image to calculate the camera gyroscope timestamp of the pixel by the formula:

$$t_{gyro}^{kp(x,y)} = \Delta T_0 + t_{frame}^{kp(x,y)} + \frac{\Delta t}{H} y - \frac{1}{2} \Delta t \quad (10)$$

where in formula (10), $\Delta t$ is a sampling time interval of the progressive scan of the video frame, and H is the number of lines of the image;

then calculating the accurate rotation matrix $R_{w2s}(t^k{}_{gyro}{}^{p(x,y)})$ of the camera motion under the camera gyroscope timestamp, where the calculation formula is:

$$R_{w2s}(t^k{}_{gyro}{}^{p(x,y)}) = R_{w2g}(t^k{}_{gyro}{}^{p(x,y)}) \cdot R_{g2s}(t^k{}_{gyro}{}^{p(x,y)}).$$

17. The method of claim 16, wherein S205 specifically is: projecting the output video frame pixel $A_4$ to the corresponding grid point $A_3$ of the spherical model, using the approximate rotation matrix to rotate $A_3$ to obtain $A_2$ in the sensor coordinate system, using the fisheye image distortion correction method to project $A_2$ onto the fisheye image to obtain the pixel $A_1$, using the accurate rotation matrix to rotate $A_1$ to obtain $A'_2$ in the sensor coordinate system, and then using the fisheye image distortion correction method to project $A'_2$ to the fisheye image to obtain the accurate pixel $A'_1$; using the mapping relationship between the output video frame pixel $A_4$ and the accurate pixel $A'_1$ in the fisheye image to render the fisheye image in reverse rendering to generate a stable video;

similarly, projecting the output video frame pixel $B_4$ to the corresponding grid point $B_3$ of the spherical model, using the approximate rotation matrix to rotate $B_3$ to obtain $B_2$ in the sensor coordinate system, using the fisheye image distortion correction method to project $B_2$ onto the fisheye image to obtain pixel $B_1$, using the accurate rotation matrix to rotate $B_1$ to obtain $B'_2$ in the sensor coordinate system, and then using the fisheye image distortion correction method to project $B'_2$ to the fisheye image to obtain the accurate pixel $B'_1$; using the mapping relationship between the output video frame pixel $B_4$ and the accurate pixel $B'_1$ in the fisheye image to render the fisheye image in reverse rendering to generate a stable video.

18. A non-transitory computer-readable medium that stores one or more computer programs including a set of computer-executable instructions, wherein when being executed by one or more processors, cause the one or more processors to perform steps of the anti-shake method for a panoramic video of claim 12.

19. A portable terminal, comprising:
one or more processors;
a memory; and
one or more computer programs including set of computer-executable instructions, where the set of computer-executable instructions are stored in the memory and are configured to be executed by the one or more processors, wherein being executed by the one or more processors execute, cause the one or more processors to perform steps of the anti-shake method for a panoramic video of claim 12.

* * * * *